United States Patent [19]

King

[11] 4,052,312
[45] Oct. 4, 1977

[54] STRAINER MAGNETS

[75] Inventor: Charles King, Belleville, Mich.

[73] Assignee: Flow Ezy Filters, Inc., Ann Arbor, Mich.

[21] Appl. No.: 416,596

[22] Filed: Nov. 16, 1973

Related U.S. Application Data

[63] Continuation-in-part of Ser. No. 299,953, Oct. 13, 1972, abandoned.

[51] Int. Cl.² .................................................. B01D 35/06
[52] U.S. Cl. ................................................. 210/223
[58] Field of Search ................. 210/222, 223; 209/221

[56] References Cited

U.S. PATENT DOCUMENTS

| 651,137 | 6/1900 | Franke | 210/222 X |
|---|---|---|---|
| 1,669,665 | 5/1928 | Karcher | 210/22 UX |
| 1,697,142 | 1/1929 | Roller | 210/222 UX |
| 3,371,790 | 3/1968 | Kudlaty et al. | 210/223 |
| 3,460,679 | 8/1969 | Llewellyn | 210/222 |
| 3,480,145 | 11/1969 | Gladden | 210/223 |
| 3,727,761 | 4/1973 | Aspinwall et al. | 210/223 |

Primary Examiner—Theodore A. Granger
Attorney, Agent, or Firm—Gifford, Chandler, Sheridan & Sprinkle

[57] ABSTRACT

A pliable magnet member adapted to be removably mounted to filter elements of different diameters to provide means for attracting metal particles to remove them from the hydraulic system with which the filter element is employed.

1 Claim, 3 Drawing Figures

STRAINER MAGNETS

RELATIONSHIP TO OTHER APPLICATIONS

The present application is a continuation-in-part of Ser. No. 299,953 filed Oct. 13, 1972 now abandoned.

FIELD OF THE INVENTION

The present invention relates to filter elements for hydraulic systems and more particularly to a pliable magnet member to be removably attached to filter elements of different diameters to attract metallic particles.

BACKGROUND OF THE INVENTION

It is often desirable to provide some means for collecting metal particles from hydraulic systems. This is usually accomplished by magnetic washers disposed within the filter element and operable to remove metallic chips and the like small enough to pass through the filter element.

While such magnetic washers are generally satisfactory they do have several important disadvantages. Only those metallic particles small enough to pass through the filter element are collected for removal from the system so that larger chips remain in the system and must be removed by other means. Removal of the washers for cleaning and replacement is difficult.

Flexible magnet members have been heretofore provided which are adapted to be mounted around the exterior surface of filter elements for removing metal particles from the fluid system. Such flexible magnet members, however, have only been capable of use with filter elements within a rather narrow range of diameters so that many different sizes had to be provided to accommodate the many different sizes of filter elements in use.

SUMMARY OF THE PRESENT INVENTION

The present invention provides a pliable magnet member adapted to be removably mounted to the outside of the filter element and to accommodate filter elements having wide differences in diameters. The number of magnet members for a given hydraulic system can be readily varied in accordance with the requirements of the particular system. Because the magnet members are mounted to the outside of the filter element rather than the inside of the element the metallic particles are collected for removal before they pass through the element. All sizes of particles then will be collected for removal. Also because the magnet members are mounted to the outside of the filter element and because of the manner in which they are mounted they can be readily removed for cleaning or replacement.

DESCRIPTION OF THE DRAWINGS

A better understanding of the present invention will be achieved upon reference to the following description of a preferred embodiment of the invention. The description makes reference to the accompanying drawings in which like reference characters refer to like parts throughout the several views and in which.

DESCRIPTION OF A PREFERRED EMBODIMENT

Figure 1:
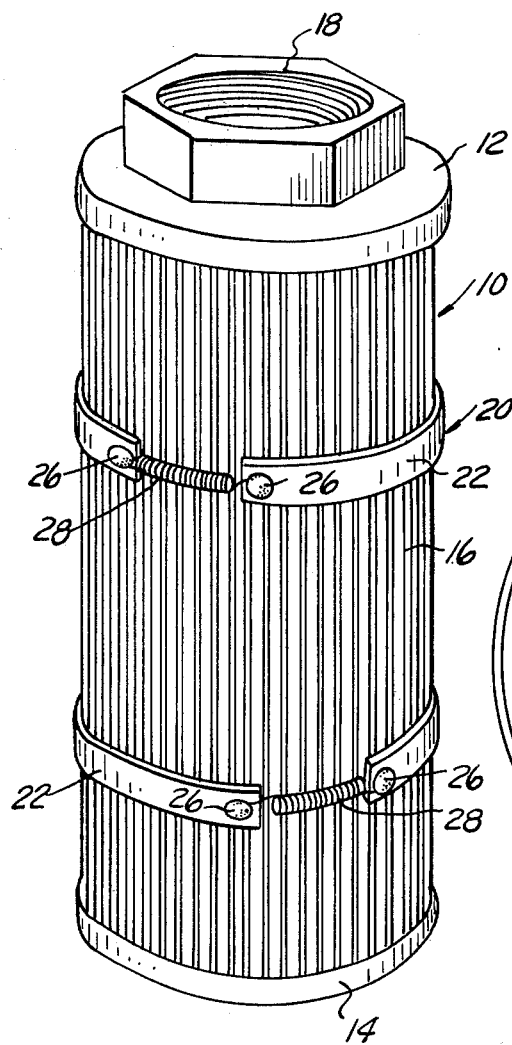
FIG. 1 is a perspective view of several magnet members of the present invention mounted in place around a filter element.

Now referring to the drawings for a more detailed description of the present invention a conventional filter element 10 is illustrated in FIG. 1 as comprising end caps 12 and 14 enclosing a corrugated, annular filter member 16. One of the end caps of the filter element 10 is provided with an outlet port 18 so that the element 10 is designed to filter fluid flowing radially inwardly through the filter member 16. The filtered fluid is then directed through the outlet 18. It will be apparent, however, as the description proceeds that the present invention can be employed with filter elements other than the type illustrated in FIG. 1, the particular filter element shown in that drawing being for purpose of illustration only.

Magnet members 20 encompass the filter member 16 at axially spaced points. Although two such magnet members 20 are shown mounted to the filter element 10 it is apparent that any number as desired can be mounted in place on the filter element 10.

Figure 2:
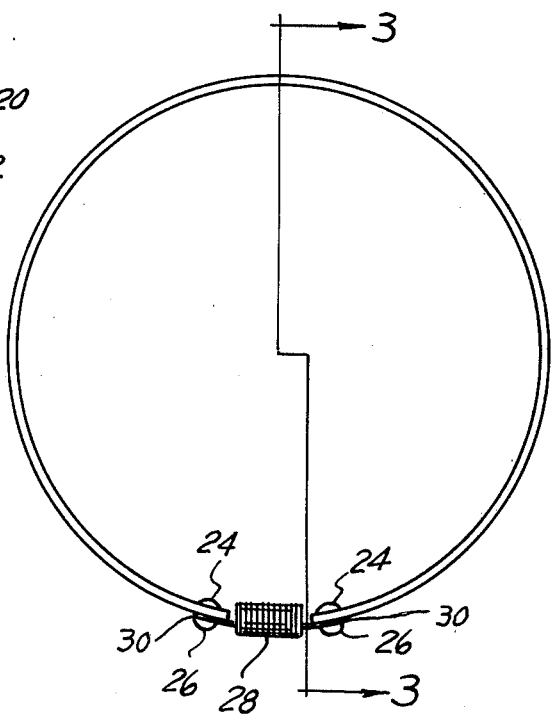
FIG. 2 is a top plan view of one of the magnet members shown in FIG. 1 enlarged somewhat for purposes of clarity.
Figure 3:
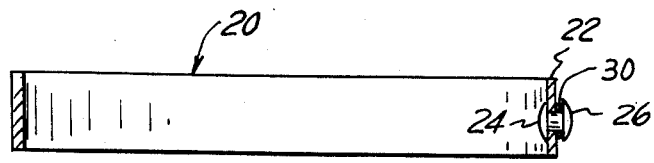
FIG. 3 is a cross sectional view taken substantially on line 3—3 of FIG. 2.

As best seen in FIGS. 2 and 3 each of the magnet members 20 comprises a band 22 of pliable magnetic material. Such material is now available and comprises tiny particles of magnet material embedded in a plastic material. A rivet member 24 is provided at each end of the band 22 and each rivet member is provided with a raised head portion 26. A coil spring 28 extends between the raised head portions 26 of the rivet members 24 to hold the magnet member 20 securely in place around the outer surface of the filter member 16. The spring 28 has curved ends 30 which as best seen in FIG. 3 extend beneath the raised head portions 26 of the rivet members 24.

It is apparent that any desired number of the magnet members 20 can be mounted to a filter device 10. The number desired might vary with the needs of the particular system in which the filter element 10 is utilized. The springs 28 and the pliable material used to make the magnet members 20 permit the magnet members 20 to accommodate filter members 16 of many different size diameters. The particular means of fastening the magnet members 20 in place means that they can be readily removed and because they are positioned exteriorly of the filter element 10 they can be readily inspected and removed from the system for cleaning and replacement.

It is also apparent that although I have described but one embodiment of the present invention many changes and modifications can be made therein without departing from the spirit of the invention as expressed by the scope of the appended claim.

I claim:

1. A fluid filter assembly comprising:
   an annular filter element adapted for insertion into a filter housing, said filter element being pleated and having an exterior surface constructed of nonmagnetizable material through which a fluid to be filtered flows into the interior of said filter element;
   an annular band of magnet material, said magnet material being formed from a pliable, relatively nonresilient material to adapt itself to the exterior surface of filter elements of different diameters and having a plurality of magnet members embedded therein throughout its length to magnetically attract particles to it throughout its length; and
   a spring member removably mounted to the ends of said band of pliable magnet material for fastening said ends together around the exterior surface of said filter element intermediate said filter element and the filter housing whereby in operation the band is in direct fluid contact with the fluid.

* * * * *